United States Patent [19]

Schlueter et al.

[11] Patent Number: 4,950,709
[45] Date of Patent: Aug. 21, 1990

[54] PROCESS FOR THE PREPARATION OF COARSE, AQUEOUS PLASTIC DISPERSIONS BY EMULSION POLYMERIZING WITH A BRANCHED POLYETHYLENE OXIDE

[75] Inventors: Herbert Schlueter, Marl; Bernhard-Peter Scholz, Oer-Erkenschwick; Wolfgang Holtrup; Klaus Walther, both of Marl, all of Fed. Rep. of Germany

[73] Assignee: Huels Aktiengesellschaft, Marl, Fed. Rep. of Germany

[21] Appl. No.: 316,940

[22] Filed: Feb. 28, 1989

[30] Foreign Application Priority Data

Mar. 1, 1988 [DE] Fed. Rep. of Germany ....... 3806497
Dec. 1, 1988 [DE] Fed. Rep. of Germany ....... 3840512

[51] Int. Cl.$^5$ ............................ C08F 2/30; C08F 2/26
[52] U.S. Cl. ..................................... 524/762; 524/457; 524/728; 524/730; 524/731; 524/757; 524/846
[58] Field of Search ..................... 524/757, 762, 846

[56] References Cited

U.S. PATENT DOCUMENTS

| 2,933,467 | 4/1960 | Borunsky | 524/762 |
| 3,143,532 | 8/1964 | Kahrs et al. | 524/762 |
| 3,272,767 | 9/1966 | Howland et al. | 524/762 |
| 3,423,352 | 1/1969 | Levine et al. | 524/762 |
| 3,423,353 | 1/1969 | Levine et al. | 524/762 |
| 3,842,025 | 10/1974 | Schluter | 525/385 |
| 3,862,075 | 1/1975 | Sekmakas | 524/762 |
| 3,989,661 | 11/1976 | Bondy | 524/308 |
| 4,076,677 | 2/1978 | Sekmakas | 524/762 |

FOREIGN PATENT DOCUMENTS 1265565 3/1972 United Kingdom .
1347196 2/1974 United Kingdom .

Primary Examiner—Morton Foelak
Assistant Examiner—Frederick Krass
Attorney, Agent, or Firm—Oblon, Spivak, McClelland, Maier & Neustadt

[57] ABSTRACT

The emulsion polymerization of free-radical-polymerizable monomers in the presence of a branched, poly(ethylene oxide) having a molecular weight of 4,000 to 19,000 and 1 to 250 mmol of the sum of the alkali metal and ammonium ions which are not bound to the emulsifier per liter of aqueous phase provides coarse, aqueous plastic dispersions. The process allows for the effective control of the particle size in the dispersion and yields carboxylated rubber dispersions which are suitable for the production of coating materials for carpets and paper.

20 Claims, No Drawings

PROCESS FOR THE PREPARATION OF COARSE, AQUEOUS PLASTIC DISPERSIONS BY EMULSION POLYMERIZING WITH A BRANCHED POLYETHYLENE OXIDE

BACKGROUND OF THE INVENTION

1. Field of the Invention:

The present invention relates to a process for the preparation of coarse aqueous plastic dispersions.

2. Discussion of the Background:

In the context of the present invention, coarse dispersions are taken to mean dispersions whose particles have a volume-average diameter (dv) in the range of 120 to 400 nm, in particular 130 to 300 nm. Dispersions of this type are still capable of flowing even after concentration to a solids content of >55% by weight and are therefore regarded as having a low viscosity.

Processes in which an anionic emulsifier, a nonionic, water-soluble or water-dispersible, polymeric auxiliary and a water-soluble salt are present during the batch polymerization have already been disclosed in the prior art.

DE-OS 2,165,410 discloses gelatin, caustisized starch, polyacrylamide, poly(ethylene oxide) (poly(ethylene glycol)), poly(vinyl alcohol), and poly(vinyl methyl ether) as polymeric auxiliaries. The polymerization is preferably carried out in the presence of a water-soluble salt containing a divalent metal ion. However, the process disclosed in DE-OS 21 65 410 requires comparatively long polymerization times. In contrast, short polymerization times are desirable as far as the economic efficiency of the process is concerned. It is generally true that in this method the larger the particle size required, the longer the polymerization time.

EP-OS 115,468 discloses ethylene oxide/propylene oxide copolymers and poly(ethylene oxide) as polymeric auxiliaries. In this method, it is necessary to add phosphate esters as anionic emulsifiers. However, it is desirable to avoid the use of phosphates for environmental considerations. Potassium persulfate and ammonium persulfate act as both polymerization initiator and salt.

German Pat. No. 2,432,983 discloses a poly(ethylene oxide) having a molecular weight of 20,000 as a polymeric auxiliary which should only be added when at least 50% by weight of the monomers have reacted. Otherwise, the polymerization rate is considerably slowed, and crust formation occurs. The disclosed salt is potassium chloride. This method exhibits the disadvantage that a viscosity maximum is observed at a monomer conversion of about 20 to 40% by weight in the case of a high monomer/water ratio, and the process is therefore difficult to control. A high monomer/water ratio is desirable for economic reasons. In a comparative experiment, the poly(ethylene oxide) having the molecular weight 20,000 is added before the polymerization.

The poly(ethylene oxides) and ethylene oxide/propylene oxide copolymers of the outlined prior art are obviously unbranched.

DE-OS 2,222,176 discloses, inter alia, poly(vinyl alcohol), partially hydrolized poly(vinyl acetate), poly(vinylpyrrolidone), poly(ethylene oxide), poly(propylene oxide) and ethylene oxide/ propylene oxide copolymers as polymeric auxiliaries which are added before the polymerization. Products of the reaction of a poly(ethylene oxide) and a ♭polyepoxide" obtained by reacting epichlorohydrin with a polyhydric phenol are preferred. In the examples, a "poly(oxyethylene) glycol compound" having the molecular weight 20,000 is particularly emphasized. Further details of the structure of this compound and on a process for its preparation are not given.

If details in this regard are taken into account from the description in DE-OS 2,222,176, the preparation by reacting a poly(ethylene oxide), i.e. a bifunctional alcohol, with a trifunctional or polyfunctional epoxide is ruled out since the resulting crosslinked poly(ethylene oxide) compound would not meet the condition of adequate water solubility and would therefore be unsuitable as a polymeric auxiliary. It is concluded that the poly(ethylene oxide) compound must be obtained by reacting a poly(ethylene oxide) with a bifunctional epoxide and is essentially unbranched. For example, the poly(ethylene oxide) compound could have been obtained by reacting a poly(ethylene oxide) having the molecular weight 5,000 with a diepoxide at a molar ratio of four to three. The poly(ethylene oxide) compound has a molecular weight distribution of varying width, depending on the width of the molecular weight distribution of the poly(ethylene oxide) employed. In Example 4 of DE-OS 2,222,176, a series of experiments using various electrolyte additives is reported, and it is disclosed that the electrolyte additive (salt additive) in addition to the potassium peroxodisulfate has no effect on the particle size.

In addition, it is difficult to prepare coarse dispersions which are at the same time substantially free of coagulate using the process of DE-OS 2,222,176.

German Pat. Nos. 1,770,934 and 2,002,094 disclose batch processes for the preparation of coarse, carboxylated synthetic rubber dispersions which do not correspond to the present process, inasmuch as the polymeric auxiliary is not present during the polymerization, but is only added after the polymerization. The auxiliary is an oxidized poly(ethylene oxide) and is added in comparatively large amounts (for example 0.1 part by weight, based on 100 parts by weight of solid). This method is disadvantageous in that an additional process step is necessary after the polymerization, that the electrolyte stability of the dispersions is inadequate for specific applications, and that the dispersions have a rather have a rather broad particle size distribution which does not always meet the demands of industry. A typical dispersion has a non-uniformity, U, of 0.18, where U is defined as follows:

$$U = \frac{dv}{dn} - 1$$

in which dv is the volume-average diameter; and dn is the number-average diameter.

The average diameters are determined by an electron-microscopic measurement method in combination with DIN 66 141. Dispersions having a narrow, monomodal or a less narrow, bimodal particle size distribution cannot be prepared by this method. In contrast, a narrow, monomodal or a less narrow, bimodal distribution is desired. In the latter case, the two groups of particles should differ essentially with respect to their size (see, e.g., P. H. Johnson et al., Rubber World, 139, 227 (1958) and J. H. Waterman et al., J. Inst. Rubber Ind., 1, 168 (1967)). In addition, the particles produced by this method are generally non-spherical, i.e. they have an irregular shape, which gives rise to a disadvantageous effect on the shelf life of the dispersions in that the viscosity increases in an undesired way on storage.

DE-OS 2,323,547 discloses another batch process for the preparation of coarse synthetic rubber dispersions, in which the polymeric auxiliary is not added until after the polymerization and which suffers from similar disadvantages. The auxiliary is added in comparatively large amounts (0.01 to 5 parts by weight, preferably 0.02 to 1.0 parts by weight, based on 100 parts by weight of solid). A typical polymeric auxiliary is an ethoxylated castor oil having the molecular weight 9,600.

Thus, there remains a need for a process for the production of coarse, aqueous plastic dispersions which does not suffer from the above-mentioned shortcomings.

SUMMARY OF THE INVENTION

Accordingly one object of the present invention is to provide a flexible process for the production of coarse, aqueous plastic dispersions which permits the specific adjustment of the particle size of the dispersions, more precisely the volume-average diameter, dv, and the particle size distribution independently of other parameters such as, for example, the molecular weight of the polymers.

It is another object to provide a process for the production of coarse aqueous plastic dispersions which possess a narrow, monomodal particle size distribution or a less narrow bimodal particle size distribution in which the two groups of particles differ with respect to their size.

It is a further object of the present invention to provide a process for the production of coarse, aqueous plastic dispersions in which the particles are spherical.

It is yet a further object of the present invention to provide a process for the production of coarse, aqueous plastic dispersions which does not require long polymerization times.

It is still another object of the present invention to provide a process for the production of coarse, aqueous plastic dispersions in which no viscosity maximum occurs during the polymerization, at high monomer/water ratios.

It is still another object of the present invention to provide a process for the production of coarse, aqueous plastic dispersions in which the addition of phosphate esters is not required.

It is yet a further object of the present invention that in the case of carboxylated plastic dispersions, the latter should be electrolyte stable.

These and other objects which will become apparent during the course of the following detailed description have been achieved by the emulsion polymerization of free-radical polymerizable monomers in the presence of 0.00001 to <0.02 parts by weight, based on 100 parts by weight of the monomer, of a branched poly(ethylene oxide) having a weight-average molecular weight ($\overline{M}w$) of 4,000 to 19,000, which is added before the polymerization, and a water-soluble alkali metal salt and/or ammonium salt which is present at the start of the polymerization in an amount such that 1 to 250 mmol of alkali metal and/or ammonium ions which are not bound to the emulsifier are present per liter of aqueous phase. The entire polymerization may be carried out in a batch procedure or the polymerization may be begun in a batch procedure and completed, after the particle formation phase is complete, under conventional graft polymerization conditions.

DETAILED DESCRIPTION OF THE PREFERRED EMBODIMENTS

The invention thus relates to a process for the preparation of coarse, aqueous plastic dispersions by emulsion polymerization of monomers which are capable of being polymerized by free radical polymerization, in the presence of an anionic emulsifier, a nonionic, water-soluble, polymeric auxiliary, a polymerization initiator which forms free radicals, and conventional polymerization auxiliaries. The process is characterized by the additional features below:

Before the polymerization, 0.00001 to <0.02, in particular 0.0001 to 0.008 parts by weight, based on 100 parts by weight of the monomer(s), of a branched poly(ethylene oxide) having $\overline{M}w$ =4,000 to 19,000, in particular 4,500 to 18,000, are added. In addition, a water-soluble alkali metal salt and/or ammonium salt must be present at the beginning of the polymerization, in an amount such that 1 to 250 mmol, in particular 10 to 100 mmol of alkali metal ions and/or ammonium ions which are not bound to the emulsifier are present per liter of aqueous phase.

In addition, it is required that the entire polymerization is carried out under batch conditions or that the polymerization is begun using batch conditions and continued and completed, after the particle formation phase, under conventional conditions of graft polymerization; the formation of new particles being avoided.

During the particle formation phase, the number of particles increases; after the particle formation phase the number of particles remains constant. The larger the targeted volume-average diameter, dv, is, the shorter the particle formation phase is. The particle formation phase is generally complete <15 minutes, in particular <10 minutes, after the start of the polymerization.

If the conditions are to be changed from batch to graft conditions, >10% by weight of all the monomers are generally introduced into the batch procedure. In general, the procedure is not changed immediately after the particle formation phase, which, under certain circumstances, does not even take 1 minute, but instead not until after conversion of >50% by weight of the initially introduced monomers. Since the conditions need not be changed immediately after completion of the particle formation phase, the precise time of the completion of the particle formation phase needs not be determined.

The present invention may be carried out as a semicontinuous emulsion feed procedure when only part of the emulsifier is initially introduced into the reactor, and the monomer, initiator and the remainder of the emulsifier are added during the polymerization, taking into account the permissible reactor fill level.

The present invention may be carried out as a semicontinuous monomer feed procedure when all the emulsifier is initially introduced into the reactor, and the monomer and, if appropriate, initiator are added during the polymerization, taking into account the permissible reactor fill level.

These definitions (cf. H. Fikentscher et al., *Angew. Chem.* 72, page 860, right-hand column, final paragraph, to page 861, left-hand column, center (1960)) apply, with the proviso that the mixture resulting from the batch procedure after the particle formation phase is present in the reactor at the beginning of the feed procedure.

An essential element of the process is a very effective particle size control system, which comprises the anionic emulsifier, the branched poly(ethylene oxide) in a notably small amount, and the surprisingly effective alkali metal ions and/or ammonium ions which are not bound to the emulsifier.

Series of experiments according to the prior art using varying amounts of ammonium peroxodisulfate as the polymerization initiator have shown that, as expected, dv decreased with increasing amounts of initiator (*J. Chem. Phys.*, 16, pp. 592 et seq. (1948)). In contrast, surprisingly, the reverse trend has been observed in the series of experiments according to the present invention. A possible interpretation of these observations is that, in contrast to the prior art, the alkali metal ions and ammonium ions which are not bound to the emulsifier play an essential role in the present invention with respect to determining dv. This discovery permits adjusting dv independently of other target parameters, such as, for example, the molecular weight of the polymers.

The components of the particle size control system of the present invention thus have a functional relationship. In contrast, no comparable particle size control system with components having a functional relationship is present in the references outlined above. The invention thus contains a fundamentally novel teaching of far-reaching significance.

The branched poly(ethylene oxides) are generally employed as a solution in an unbranched poly(ethylene oxide), i.e. they need not be separated, for example by precipitation fractionation, from the mixtures of unbranched and branched poly(ethylene oxide) obtained, for example, in the oxidation of poly(ethylene oxide) or in the ethoxylation of pentaerythritol or castor oil. The content of branched poly(ethylene oxide) in the mixture and its weight average molecular weight ($\overline{M}w$) are determined by gel chromatographic analysis. In general, the unbranched poly(ethylene oxide) has a lower weight average molecular weight than the branched poly(ethylene oxide) in the same sample. The mixture generally contains 15 to 90% by weight of the branched poly(ethylene oxide). The gel chromatographic analysis is carried out using tetrahydrofuran as the solvent, a heterogeneously crosslinked polystyrene gel having a particle size of 5μm as the column material, with the aid of a differential refractometer as detector and using unbranched poly(ethylene oxides) as the calibration substances.

The branched poly(ethylene oxides) may be irregularly or regularly branched. They can, for example, have a star-shaped or comb-like structure. They preferably contain no hydrophobic radicals having more than 20 C atoms.

The oxidation of poly(ethylene oxide) having a $\overline{M}w$ of 2,500 to 6,500, preferably 3,000 to 5,500, to give an oxidized poly(ethylene oxide) having a carbonyl group content of from 0.1 to 2.0, in particular 0.5 to 2.0% by weight, is known from German Pat. No. 1,213,984. In this reference, an oxidized poly(ethylene oxide) is obtained which contains a branched poly(ethylene oxide). The branched poly(ethylene oxide) is an example of an irregularly branched poly(ethylene oxide). The oxidized poly(ethylene oxide) is generally obtained by air oxidation of a poly(ethylene oxide) whose nonuniformity ($U = \overline{M}w/\overline{M}n - 1$) is 0.1 to 0.3, preferably 0.15 to 0.25.

$\overline{M}w$ and $\overline{M}n$ of the poly(ethylene oxide) employed for the oxidation are determined by gel chromatography under the above-mentioned conditions. The carbonyl group content of the oxidized poly(ethylene oxide) is determined by IR analysis using the 5.8 μm band.

The amount of oxidized poly(ethylene oxide) is generally 0.001 to 0.05, in particular 0.0015 to 0.02 parts by weight, based on 100 parts by weight of monomer.

Regularly branched poly(ethylene oxides) having a star-shaped structure are obtained, for example, by reacting a low-molecular-weight compound containing at least three, in particular at least four, ethoxylatable functional groups with ethylene oxide, of which up to 30 mol% may be replaced by propylene oxide. Suitable ethoxylatable functional groups are, for example, primary, and with limitations also secondary, alcoholic hydroxyl groups, phenolic hydroxyl groups and carboxyl groups. Suitable ethoxylatable compounds are, for example, trimethylolpropane, castor oil, trihydroxybenzenes, trimesic acid, pentaerythritol, pyromellitic acid, gallic acid and hexitols.

Regularly branched poly(ethylene oxides) having a star-shaped structure can also be obtained by the reaction of (a) a low-molecular-weight silane or siloxane containing at least three alkoxy groups which can be transesterified or a low-molecular-weight compound containing at least three isocyanate groups or alkyl carboxylate groups which alkyl carboxylate groups can be transesterified, wherein the carboxyl groups from which the alkyl carboxylate groups are derived are connected to one another by an organic radical with (b) an unbranched poly(ethylene oxide) monoalkyl ether, in which up to 30 mol% of the ethylene oxide may be replaced by propylene oxide.

Preferred branched poly(ethylene oxides) are obtained by the reaction of tetraethoxysilane, the trimerization product of isophorone diisocyanate, trimethyl trimesate, triethyl trimesate, trimethyl trimellitate, or triethyl trimellitate with poly(ethylene oxide) monoethyl ether. They exist as a solution in unbranched poly(ethylene oxide). Isolation of the branched poly(ethylene oxide) is not necessary.

Homopolymers and copolymers of the industrially important monomers which can be polymerized by means of free radicals can be obtained by the present invention. The monomers can be ethylenically monounsaturated, such as, for example, vinyl chloride, vinylidene chloride, vinyl esters, monoalkenyl-aromatic compounds, vinylpyridine, (meth)acrylonitrile, (meth)acrylates and α,β-ethylenically unsaturated carboxylic acids. The monomers can belong to the group comprising the aliphatic, conjugated dienes, such as, for example, 1,3-butadiene and isoprene. The proportion of unsaturated carboxylic acids in the monomer mixture is generally not greater than 30% by weight. The polymers may be modified by means of a small proportion of another monomer, such as, for example, (meth)acrylamide.

In a preferred process, the monomer mixture contains 25 to 68.5% by weight ff a hardener monomer such as styrene, (meth)acrylonitrile and methyl methacrylate; 30 to 70% by weight of a plasticizing monomer such as 1,3-butadiene and ($C_4$- to $C_8$-alkyl) (meth)acrylate; and 1.5 to 5% by weight of an α,β-unsaturated carboxylic acid such as (meth)acrylic acid, itaconic acid, fumaric acid, and the monoesters of the latter two compounds. The copolymer dispersions obtained have a minimum film formation temperature of $<100°$ C. They are electrolyte stable and are advantageously suitable for the production of coating materials for carpets (precoating) and paper.

Suitable emulsifiers are the conventional anionic emulsifiers, in particular: (1) sulfonic acids, such as alkylsulfonic acids, alkyl-arylsulfonic acids, $C_{13}$- to $C_{18}$-sulfosuccinates, and the alkali metal and ammonium salts thereof; (2) $C_{10}$- to $C_{20}$-sulfuric acid monoesters and the alkali metal and ammonium salts thereof; and (3) fatty soaps and resin soaps.

All three groups of emulsifiers are suitable if the polymerization is to be carried out in the alkaline pH region. The first two groups are suitable if the polymerization is to be carried out in the acidic pH region, in particular in the preparation of carboxylated dispersions.

The polymerization initiator may be any conventional polymerization initiator which forms free radicals. It may be an organic peroxide or hydroperoxide, such as, for example, cumene hydroperoxide, in combination with a water-dispersible reducing agent, such as, for example, iron(II) sulfoxylate complex (initiator of the redox type) or an inorganic peroxide, such as, for example, potassium peroxodisulfate and sodium perborate, or hydrogen peroxide. When using the initiator of the redox type, the polymerization can be carried out at a temperature between 0 and 50° C. When using an inorganic peroxide, the polymerization is generally carried out between 50 and 80° C.

It is noteworthy that a trend in the dependency of the volume-average particle diameter, dv, on the polymerization temperature which is opposite to that of the prior art is observed in the persulfate-initiated polymerization. At a comparatively high temperature, a greater value for dv is obtained than at a lower temperature.

As the amount of initiator employed increases, the polymerization time required decreases and the molecular weight of the polymer drops.

The particle size distribution of the dispersions can be controlled by means of the amount of emulsifier, if appropriate in combination with the amount of persulfate. In the case of the preparation of carboxylated dispersions, a narrow, monomodal distribution is generally obtained when <2 parts by weight of emulsifier is used, irrespective of the amount of persulfate, and a less narrow, bimodal distribution is obtained when ≧2 parts by weight of emulsifier in combination with ≧0.8 parts by weight of persulfate is used. The rule also applies, with higher limits, to the preparation of non-carboxylated dispersions. The limits can be readily determined by simple preliminary experiments.

Suitable alkali metal and ammonium salts are, for example, the chlorides, sulfates, persulfates, perborates, carbonates, phosphates and also the salts of conventional polymerization auxiliaries, such as, for example, the ethylenediaminetetraacetates used as complexing agents, and the salts of the products of the condensation of naphthalenesulfonic acid and formaldehyde, of poly-2-acrylamido-2-methylpropanesulfonic acid (DE-AS 2,540,468) and of the polysulfonic acids of an alkane of moderate chain length (European Pat. No. 0,036,904), which are used as dispersants.

In addition to the polymerization auxiliaries, whose alkali metal ions and ammonium ions must be taken into account in the overall balance of the alkali metal and ammonium ions which are not bound to the emulsifier, it is possible to add further conventional polymerization auxiliaries, for example regulators, such as dodecyl mercaptan.

The polymerization is normally carried out to a conversion of 100% by weight. However, it can also be terminated at lower conversions. The residual monomers are then recovered in a separate process step.

For the preparation of the dispersions, a pressure-tight stirred vessel, which is equipped with a cooling jacket or other known cooling device to dissipate the heat of polymerization, can be used. In the case of batch polymerization, the polymerization reactor is filled with water, emulsifier, monomers, and the auxiliaries after evacuation and flushing with nitrogen in a conventional manner. The monomer/water ratio is preferably adjusted so that the solids content after the polymerization is 30 to 55% by weight. The polymerization is then initiated by adding the polymerization initiator and by increasing the temperature. The polymerization time is generally 8 to 15, preferably 8 to 12 hours. If, in the case of the preparation of carboxylated dispersions, the polymerization is carried out in the acidic pH region, the pH is generally adjusted to from 8.5 to 9.0 using ammonia after completion of the polymerization.

The dispersions obtained can be employed directly in certain areas of application, i.e. without changing the solids content and the viscosity. Some areas of application require the evaporation of the dispersion obtained above to the solids content desired. The dispersion can be evaporated to the viscosity 1,200 mPa s, measured at room temperature using a Brookfield viscometer (spindle 3, 30 rpm), which results in a solids content of from 55 to 70% by weight, depending on the particle size and particle size distribution present. The evaporation is generally carried out at a temperature of 20 to 60° C. with stirring in vacuo. Such concentrated dispersions are useful, in the case of carboxylated synthetic rubber dispersions, for the production of coating materials for carpets (pre-coating) and paper. Non-carboxylated synthetic rubber dispersions are useful for foam coating of carpet backs and for the production of foam moldings. Polystyrene dispersions are useful as reinforcing agents for rubber dispersions.

Other features of the invention will become apparent in the course of the following descriptions of exemplary embodiments which are given for illustration of the invention and are not intended to be limiting thereof.

Examples

In the examples, percent (%) denotes percent by weight and parts (P) denotes parts by weight. The comparative examples and comparative dispersions, which are not in accord with the present invention, are indicated by capital letters.

Procedure for determining the electrolyte stability of the dispersions

A series of aqueous NaCl solutions with increasing concentration, beginning with 1.5% and ending with 25%, was produced, the concentration increasing by 0.5% increments.

50 ml of one of the NaCl solutions were introduced into a 150 ml beaker. Using a 1 ml volumetric pipette, 1 drop of the dispersion to be tested was added to the NaCl solution, which was agitated by shaking. The dispersion is stable if a coagulate does not form.

The NaCl solution having the highest concentration to which the dispersion is stable is given in the Table.

Examples 1 to 9 and Comparative Examples A to F

In these examples, an unbranched poly(ethylene oxide) (PEO, $\overline{Mw}=3,140$, $U=0.21$), an oxidized poly(ethylene oxide) (PEOox, carbonyl group content: 1.0%) obtained by air oxidation of PEO according to German Pat. No. 1,213,984, and a commercially available poly(ethylene oxide) compound (PEOcomp, $\overline{Mw}=20,000$, cf. DE-OS 2,222,176) were employed as the polymeric auxiliary.

PEOox contains 80% of an unbranched poly(ethylene oxide) and 20% of a branched poly(ethylene oxide) having $\overline{Mw}=5,240$, in accord with the present invention.

PEOcomp contains 70% of an unbranched component and 30% of a branched component having $\overline{Mw}=25,000$.

Example 1

Preparation of the carboxylated SBR Dispersion 1.

150 parts of demineralized water, 0.5 parts of a commercially available sodium ($C_{16}$- to $C_{18}$-paraffin)sulfonate, 0.004 parts of PEOox, 0.29 parts of ammonium sulfate, 0.05 parts of the tetrasodium salt of ethylenediaminetetraacetic acid, 2.5 parts of acrylic acid, 57.5 parts of styrene, 0.75 parts of tert-dodecyl mercaptan and 40 parts of 1,3-butadiene were combined in a 40 liter polymerization reactor, a pH of 2.3 being produced. The batch was heated to 50° C. An aqueous solution of 0.2 parts of ammonium peroxodisulfate was then added. The temperature was increased to 80° C. over the course of 4 hours, and the polymerization was continued and completed over the course of a further 6 hours. The pH was then adjusted to 8.5 using ammonia. The thus-obtained dispersion was coagulate-free and had a solids content of about 40%. It was concentrated until the viscosity was 1,200 mPa s. The solids content was then 60%. The dispersion was characterized as indicated in the Table.

Example 2

Preparation of the carboxylated SBR Dispersion 2.

The procedure of Example 1 was followed, but no ammonium sulfate was added and the amount of ammonium peroxodisulfate was increased to 0.8 parts. The results are shown in the Table. With the same amount of ions not bound to the emulsifier, good agreement was observed with respect to dv and the solids content at 1,200 mPa s.

Examples 3 and 4

Preparation of the carboxylated SBR Dispersions 3 and 4.

The procedure of Example 2 was followed, but the amount of ammonium peroxodisulfate was set at 0.5 parts and 1.0 part, respectively. The results are shown in the Table. These two examples illustrate the great effectiveness of the ions not bound to the emulsifier with respect to adjusting dv and the solids content at 1,200 mPa s.

Comparative Examples A to C

Preparation of the carboxylated SBR Dispersions A to C.

The procedure of Example 2 was followed, but 0.000001 parts of PEOcomp were added in place of the 0.004 parts of PEOox, and the amount of ammonium peroxodisulfate was adjusted to 0.2, 0.5, and 0.8 parts, respectively. The results ar shown in the Table. These Comparative Examples demonstrate that the ions not bound to the emulsifier have no effect with respect to adjusting dv and the solids content of the dispersion at 1,200 mPa s, in the absence of a branched poly(ethylene oxide) according to the present invention.

Examples 5 and 6

Preparation of the carboxylated SBR Dispersions 5 and 6.

The procedure of Example 2 was followed, but the amount of paraffin sulfonate was increased to 2.7 parts and the amount of styrene to 77.5 parts, the amount of butadiene was reduced to 20 parts and the amount of ammonium peroxodisulfate was adjusted to 0.3 and 0.5 parts, respectively. The results are shown in the Table.

Comparative Examples D and E

Preparation of the carboxylated SBR Dispersions D and E.

The procedure of Example 3 was followed, but 0.008 parts of PEOox were added after a monomer conversion of 42 and 78%, respectively, instead of 0.004 parts of PEOox before the polymerization. The results are shown in the Table.

Comparative Example F

Preparation of the carboxylated SBR Dispersion F.

The procedure of Example 3 was followed, but 0.008 parts of PEO were added in place of the 0.004 parts of PEOox. The results are shown in the Table.

Examples 7 and 8

Preparation of the SBR Dispersions 7 and 8.

The procedure of Example 2 was followed, but the amount of PEOox was increased to 0.006 parts; 2.7 parts of potassium oleate were added in place of 0.5 parts of paraffin sulfonate; the acrylic acid was omitted; the amount of styrene was increased to 80 parts; the amount of butadiene was reduced to 20 parts; and the amount of ammonium peroxodisulfate was adjusted to 0.8 and 1.0 parts, respectively. The results are shown in the Table.

Example 9

Preparation of SBR Dispersion 9.

52 Parts of demineralized water, 2.7 parts of potassium oleate, 0.48 parts of the sodium salt of the condensation product of naphthalenesulfonic acid and formaldehyde, 0.006 parts of PEOox, 0.29 parts of potassium chloride, 31 parts of styrene, 0.08 parts of tert-dodecyl mercaptan, and 69 parts of 1,3-butadiene were combined in a 40 liter polymerization reactor. After the batch had been cooled to 10° C., an aqueous solution of 0.05 parts of sodium formaldehyde sulfoxylate, 0.026 parts of the tetrasodium salt of ethylenediaminetetraacetic acid and 0.005 parts of iron(II) sulfate heptahydrate was added. After the pH had been adjusted to 10.8, 0.056 parts of pinane hydroperoxide were added. The temperature was increased to 50° C. over the course of 4 hours, and the polymerization was continued for a further 8 hours. The polymerization was then terminated at a monomer conversion of 70% by adding 0.039 parts of diethylhydroxylamine (85% strength). The dispersion obtained was coagulate-free. The residual monomers were separated. The dispersion was concentrated to a viscosity of 1,200 mPa s. The solids content was then 63%. The dispersion was characterized as indicated in th Table.

Examples 10 to 12

In Examples 10 to 12, an ethoxylated pentaerythritol (PETethox) and an ethoxylated castor oil (CASethox) were employed as the polymeric auxiliary.

PETethox contains 30% of an unbranched poly(ethylene oxide) and 70% of a branched poly(ethylene oxide) having $\overline{M}w = 15,400$.

CASethox contains 20% of an unbranched poly(ethylene oxide) and 80% of a branched poly(ethylene oxide) having $\overline{M}w = 8,100$.

Example 10

Preparation of the carboxylated SBR Dispersion 10.

The procedure of Example 1 was followed, but 0.0046 parts of PETethox were added in place of the 0.004 parts of PEOox. The results are shown in the Table.

Examples 11 and 12

Preparation of the carboxylated SBR Dispersions 11 and 12.

The procedures followed were as in Examples 2 and 3, respectively; however, 0.004 parts of CASethox were added in place of the 0.004 parts of PEOox. The results are shown in the Table.

Dispersions 1 to 12 have a narrow, monomodal particle size distribution.

Obviously, numerous modifications and variations of the present invention are possible in light of the above teachings. It is therefore to be understood that within the scope of the appended claims, the invention may be practiced otherwise than as specifically described herein.

What is claimed is:

1. A process for the preparation of a coarse, aqueous plastic dispersion, which comprises emulsion polymerizing a monomer capable of being polymerized by free radical polymerization, in the presence of an aqueous phase, an anionic emulsifier, a branched poly(ethylene oxide) having a weight-average molecular weight, $\overline{M}w$ of 4,000 to 19,000 and present in an amount of $10^{-5}$ to <0.02 parts by weight, based on 100 parts by weight of said monomer and a water-soluble alkali metal or ammonium salt present in an amount such that 1 to 250 mmol of the sum of alkali metal ions and ammonium ions which are not bound to said emulsifier are present per liter of said aqueous phase, wherein said poly(ethylene oxide) and said water-soluble salt are present before said polymerizing is initiated, and wherein said polymerizing is carried out under batch conditions at least until the particle formation phase is complete, to obtain a coarse, aqueous plastic dispersion of particles having a volume-average diameter (dv) in the range of 120 to 400 nm.

2. The process of claim 1, wherein said polymerizing is carried out entirely under batch conditions.

3. The process of claim 1, wherein said polymerizing is continued under graft polymerization conditions after said particle formation phase is complete.

4. The process of claim 3, wherein said polymerizing is continued under semicontinuous emulsion feed conditions or semicontinuous monomer feed conditions after said particle formation phase is complete.

5. The process of claim 1, wherein said poly(ethylene oxide) is comprised in an oxidized poly(ethylene oxide) having a carbonyl group content of from 0.1 to 2.0% by weight which oxidized poly(ethylene oxide) is obtained by oxidizing a poly(ethylene oxide) having a weight-average molecular weight, $\overline{M}w$, of 2,500 to 6,500.

6. The process of claim 5, wherein said poly(ethylene oxide) is comprised of an oxidized poly(ethylene oxide) having a carbonyl group content of 0.5 to 2.0% by weight which oxidized poly(ethylene oxide) is obtained by oxidizing a poly(ethylene oxide) having weight-average molecular weight, $\overline{M}w$, of 3,000 to 5,500.

TABLE

Preparation and characterization of Dispersions 1 to 12 and A to F.

| Dispersion | Anionic emulsifier (P/100 P of a monomer) Paraffin sulfonate | Oleate | Polymeric auxiliary (branched component) (P/100 P of monomer) | | [Na$^+$] + [K$^+$] + [NH$_4^+$] not bound to the emulsifier (mmol/l) | P time (h) | ST (mN/m) | dv (nm) | U | Solids content at 1,200 mPa s (%) | Stable to NaCl Solution of conc. (%) |
|---|---|---|---|---|---|---|---|---|---|---|---|
| 1 | 0.5 | | 0.004 | (0.0008) PEOox | 54 | 10 | 58 | 240 | 0.007 | 60 | 25 |
| 2 | 0.5 | | 0.004 | (0.0008) PEOox | 54 | 13 | 48 | 230 | 0.009 | 60 | 25 |
| 3 | 0.5 | | 0.004 | (0.0008) PEOox | 33 | 7 | 57 | 160 | 0.01 | 55 | 25 |
| 4 | 0.5 | | 0.004 | (0.0008) PEOox | 69 | 16 | 40 | 283 | 0.007 | 65 | 25 |
| A | 0.5 | | 0.000001 | (0.0000003) PEOcomp | 15 | 8 | 64 | 125 | 0.15 | 55 | 12 |
| B | 0.5 | | 0.000001 | (0.0000003) PEOcomp | 33 | 8 | 61 | 109 | 0.02 | 52 | 10 |
| C | 0.5 | | 0.000001 | (0.0000003) PEOcomp | 54 | 7 | 60 | 113 | 0.02 | 53 | 15 |
| 5 | 2.7 | | 0.004 | (0.0008) PEOox | 21[3] | 7 | 43 | 131 | 0.01 | 55 | 25 |
| 6 | 2.7 | | 0.004 | (0.0008) PEOox | 33[3] | 7 | 34 | 189 | 0.01 | 59 | 25 |
| D | 0.5 | | 0.008 | (0.0016) PEOox[1] | 33 | 6 | 65 | 91 | 0.007 | 49 | 7 |
| E | 0.5 | | 0.008 | (0.0016) PEOox[2] | 33 | 6 | 67 | 92 | 0.007 | 49 | 5 |
| F | 0.5 | | 0.008 | (—) PEO | 33 | 6 | 66 | 74 | 0.006 | 47 | 4 |
| 7 | | 2.7 | 0.006 | (0.0012) PEOox | 54 | 9 | 60 | 138 | 0.015 | 56 | 5 |
| 8 | | 2.7 | 0.006 | (0.0012) PEOox | 69 | 10 | 52 | 194 | 0.02 | 61 | 6 |
| 9 | | 2.7 | 0.006 | (0.0012) PEOox | 75 | 12 | 52 | 210 | 0.03 | 63 | 4 |
| 10 | 0.5 | | 0.0046 | (0.0032) PETethox | 54 | 13 | 46 | 231 | 0.009 | 60 | 25 |
| 11 | 0.5 | | 0.004 | (0.0032) CASethox | 54 | 10 | 47 | 210 | 0.007 | 60 | 25 |
| 12 | 0.5 | | 0.004 | (0.0032) CASethox | 33 | 8 | 56 | 156 | 0.004 | 58 | 25 |

P time = polymerization time; ST = surface tension
[1]The PEOox was added after a monomer conversion of 42%.
[2]The PEOox was added after a monomer conversion of 78%.
[3]The value corresponds only approximately to the actual value since a small amount of NaCl introduced together with the commercially available paraffin sulfonate was not taken into account.

7. The process of claim 1, wherein said poly(ethylene oxide) is comprised in a product obtained by the reaction of a low-molecular-weight compound containing at least three ethoxylatable functional groups and ethylene oxide.

8. The process of claim 7, wherein up to 30 mol% of said ethylene oxide is replaced by propylene oxide.

9. The process of claim 7, wherein said low molecular weight compound is a member selected from the group consisting of pentaerythritol and castor oil.

10. The process of claim 1, wherein said poly(ethylene oxide) is comprised in a product obtained by the reaction of (a) a low molecular weight silane or siloxane which contains at least three alkoxy groups which can be transesterified or a low molecular weight compound containing at least three isocyanate groups or alkyl carboxylated groups which alkyl carboxylate groups can be transesterified wherein the carboxyl groups from which the alkyl carboxylate groups are derived are connected to one another via an organic radical, with (b) an unbranched poly(ethylene oxide) monoalkyl ether, in which up to 30 mol% of the ethylene oxide units may be replaced by propylene oxide units.

11. The process of claim 10, wherein said poly(ethylene oxide) is comprised in a product obtained by the reaction of one member selected from the group consisting of tetraethoxysilane, the trimerization product of isophorone diisocyanate, trimethyl trimesate, triethyl trimesate, trimethyl trimellitate, and triethyl trimellitate with poly(ethylene oxide) monoethyl ether.

12. The process of claim 1, wherein said anionic emulsifier is present in an amount of 0.01 to 4.0 parts by weight, based on 100 parts by weight of said monomer, during said polymerizing.

13. The process of claim 12, wherein said anionic emulsifier is present in an amount from 0.02 to 3.0 parts by weight, based on 100 parts by weight of said monomer.

14. The process of claim 1, wherein said polymerizing is initiated by a persulfate.

15. The process of claim 14, wherein said persulfate is added in an amount from 0.1 to 2.5 parts by weight, based on 100 parts by weight of said monomer.

16. The process of claim 15, wherein said persulfate is added in an amount of from 0.1 to 1.5 parts by weight, based on 100 parts by weight of said monomer.

17. The process of claim 1, wherein the ratio of said monomer to said aqueous phase is adjusted so that said dispersion has a solids content of from 30 to 55% by weight after said polymerization.

18. The process of claim 1, wherein said monomer is one or more members selected from the group consisting of vinyl chloride, vinylidene chloride, vinyl esters, monoalkenyl-aromatic compounds, vinylpyridine, acrylonitrile, methacrylonitrile, acrylates, methacrylates, $\alpha,\beta$-ethylenically unsaturated carboxylic acids, and aliphatic, conjugated dienes.

19. The process of claim 18, wherein said monomer contains no more than 30% by weight of said unsaturated carboxylic acid.

20. The process of claim 1, wherein said polymerizing is conducted in the presence of a regulator.

* * * * *

UNITED STATES PATENT AND TRADEMARK OFFICE
CERTIFICATE OF CORRECTION

PATENT NO. : 4,950,709

DATED : AUGUST 21, 1990

INVENTOR(S) : HERBERT SCHLUETER ET AL

It is certified that error appears in the above-identified patent and that said Letters Patent is hereby corrected as shown below:

```
Column 12:
    Claim 6, line 2, "of" should read --in--.
```

Signed and Sealed this

Twenty-fourth Day of November, 1992

Attest:

DOUGLAS B. COMER

Attesting Officer

Acting Commissioner of Patents and Trademarks